(12) United States Patent
Arias Drake et al.

(10) Patent No.: US 10,769,008 B1
(45) Date of Patent: Sep. 8, 2020

(54) SYSTEMS AND METHODS FOR AUTOMATIC FORMAL METASTABILITY FAULT ANALYSIS IN AN ELECTRONIC DESIGN

(71) Applicant: Cadence Design Systems, Inc., San Jose, CA (US)

(72) Inventors: Alberto Manuel Arias Drake, Belo Horizonte (BR); Andrea Iabrudi Tavares, Belo Horizonte (BR); Artur Melo Mota Costa, Belo Horizonte (BR); Fabiano Cruz Peixoto, Belo Horizonte (BR); Laiz Lipiainen Santos, Belo Horizonte (BR); Lucas Ferreira de Melo Diniz, Belo Horizonte (BR); Nathália Peixoto Reis, Belo Horizonte (BR); Patricia Sette Câmara Haizer, Belo Horizonte (BR); Regina Mara Amaral Fonseca, Belo Horizonte (BR); Tamires Vargas Capanema Franco Santos, Belo Horizonte (BR)

(73) Assignee: Cadence Design Systems, Inc., San Jose, CA (US)

( * ) Notice: Subject to any disclaimer, the term of this patent is extended or adjusted under 35 U.S.C. 154(b) by 507 days.

(21) Appl. No.: 15/370,565

(22) Filed: Dec. 6, 2016

(51) Int. Cl.
*G06F 11/00* (2006.01)
*G06F 11/07* (2006.01)

(52) U.S. Cl.
CPC ........ *G06F 11/079* (2013.01); *G06F 11/0724* (2013.01)

(58) Field of Classification Search
CPC .. G06F 17/50; G06F 17/5022; G06F 17/5045; G06F 17/505; G06F 17/5031;
(Continued)

(56) References Cited

U.S. PATENT DOCUMENTS

| 5,555,201 A | * | 9/1996 | Dangelo | G01R 31/31704 703/13 |
| 5,684,721 A | * | 11/1997 | Swoboda | G01R 31/31853 703/23 |

(Continued)

OTHER PUBLICATIONS

Ginosar, "Metastability and Synchronizers A Tutorial", 2011, IEEE, pp. 1-14 (Year: 2011).*

(Continued)

*Primary Examiner* — Bryce P Bonzo
*Assistant Examiner* — Jeison C Arcos
(74) *Attorney, Agent, or Firm* — Mark H. Whittenberger, Esq.; Holland & Knight LLP

(57) ABSTRACT

The present disclosure relates to a computer-implemented method for use in an electronic design. The method may include receiving, using at least one processor, an electronic design and analyzing the electronic design. The method may further include generating one or more preconditions representative of metastability effects at the output of at least one synchronizer associated with the electronic design. The method may also include generating, based upon, at least in part, the one or more preconditions, one or more properties configured to analyze a propagation of the metastability effects associated with the at least one synchronizer.

12 Claims, 4 Drawing Sheets

(58) Field of Classification Search
CPC ............. G06F 17/5081; G06F 2217/84; G01R 31/21704; G01R 31/318364; H04L 7/041
See application file for complete search history.

(56) References Cited

U.S. PATENT DOCUMENTS

| | | | | |
|---|---|---|---|---|
| 5,933,356 | A * | 8/1999 | Rostoker | G01R 31/31704 703/15 |
| 6,408,265 | B1 * | 6/2002 | Schultz | G06F 17/5022 327/141 |
| 6,484,292 | B1 * | 11/2002 | Jain | G06F 17/505 716/104 |
| 6,920,416 | B1 * | 7/2005 | Swoboda | G06F 11/261 703/13 |
| 7,089,518 | B2 * | 8/2006 | Bair | G06F 17/5022 716/106 |
| 7,171,633 | B1 * | 1/2007 | Hwang | G06F 17/505 716/103 |
| 7,441,210 | B2 * | 10/2008 | Lahner | G06F 17/5045 716/100 |
| 7,882,473 | B2 * | 2/2011 | Baumgartner | G06F 17/504 326/93 |
| 8,327,307 | B2 * | 12/2012 | Kronke | H04L 7/02 716/134 |
| 8,370,776 | B1 * | 2/2013 | Chan | G06F 17/505 716/105 |
| 8,499,270 | B1 * | 7/2013 | Best | G06F 17/5054 716/116 |
| 8,631,364 | B1 * | 1/2014 | Dobkin | G06F 17/5045 716/100 |
| 8,661,380 | B1 * | 2/2014 | Baeckler | G06F 17/505 716/104 |
| 8,661,383 | B1 * | 2/2014 | Dobkin | G06F 17/5081 716/102 |
| 8,745,561 | B1 * | 6/2014 | Garg | G06F 17/5031 703/16 |
| 2003/0023941 | A1 * | 1/2003 | Wang | G01R 31/31704 716/103 |
| 2004/0068331 | A1 * | 4/2004 | Cronquist | G06F 17/5045 700/18 |
| 2004/0221249 | A1 * | 11/2004 | Lahner | G06F 17/5022 716/102 |
| 2005/0069068 | A1 * | 3/2005 | Gundurao | H03M 9/00 375/354 |
| 2005/0251779 | A1 * | 11/2005 | Chard | G06F 17/5022 716/108 |
| 2005/0268265 | A1 * | 12/2005 | Ly | G06F 30/33 716/108 |
| 2006/0206846 | A1 * | 9/2006 | Kowatari | G06F 17/5022 716/106 |
| 2006/0253819 | A1 * | 11/2006 | Meyer | G06F 17/5081 716/106 |
| 2007/0006111 | A1 * | 1/2007 | Otsuka | G06F 17/5045 716/104 |
| 2007/0050737 | A1 * | 3/2007 | Weinraub | G06F 30/33 326/40 |
| 2007/0271542 | A1 * | 11/2007 | Ja | G06F 17/5022 716/103 |
| 2008/0134115 | A1 * | 6/2008 | Ly | G06F 17/5022 716/103 |
| 2008/0201128 | A1 * | 8/2008 | Baumgartner | G06F 17/5022 703/15 |
| 2010/0269023 | A1 * | 10/2010 | Yang | G11B 20/18 714/769 |
| 2010/0287524 | A1 * | 11/2010 | Ly | G06F 17/5022 716/113 |
| 2011/0058631 | A1 * | 3/2011 | Tan | H04L 1/0045 375/340 |

OTHER PUBLICATIONS

Narasimhamurthy, "Synchronization In Digital Systems", 2011, International Conference on Information and Network Technology, IPCSIT vol. 4, pp. 1-5 (Year: 2011).*

Messerchhmitt, "Synchronization In Digital Systems design", Oct. 1990, IEEE vol. 8 No. 8, pp. 1404-1419 (Year: 1990).*

Marino, "General Theory of Metastable Operation", Feb. 1981, IEEE vol. C-30 No. 2, pp. 107-115 (Year: 1981).*

Kaeslin, "Digital Integrated Circuit Design From VLSI Architectures to CMOS Fabrication", 2008, Cambridge University Press, pp. 581-614 (Year: 2008).*

Tarawneh "Formal Verification of Clock Domain Crossing using Gate-level Models of Metastable Flip-Flops", Mar. 31, 2016, pp. 1-6 (Year: 2016).*

Verma "Understanding clock domain crossing issues" 2007, Atrenta, pp. 1-7 (Year: 2007).*

Kleeman, "Metastability Behavior in Digital Systems" 1987, IEEE, pp. 1-16 (Year: 1987).*

Kinniment, "Measuring Deep Metastability and Its Effect on Synchronizer Performance", Sep. 9, 2007, IEEE, pp. 1-12 (Year: 2007).*

* cited by examiner

SYSTEMS AND METHODS FOR AUTOMATIC FORMAL METASTABILITY FAULT ANALYSIS IN AN ELECTRONIC DESIGN

FIELD OF THE INVENTION

The present disclosure relates to electronic design techniques, and more specifically, to a system and method for automatic formal metastability fault analysis of an electronic design.

DISCUSSION OF THE RELATED ART

Simulation-based verification can be used to debug metastability convergence problems but, at present, metastability coverage metrics offered by simulation are not reliable enough to provide the level of confidence demanded by users. Metastability convergence analysis in formal verification could be done by manually adding properties to model both the effects of metastability and its propagation through the design.

Users are not confident that current metastability coverage metrics for simulation-based verification offer the necessary level of confidence to guarantee that every metastability occurrence and convergence path in the design are exercised. In the case of formal tools, a number of properties should be added by the user to model both the effects of metastability and its propagation through the design. Without them, solving the problem would suffer from the state-explosion problem, thus decreasing performance and scalability. However, the level of knowledge and configuration that generating the properties requires from the user becomes a significant obstacle.

SUMMARY

In one or more embodiments of the present disclosure, a computer-implemented method for use in an electronic design is provided. The method may include receiving, using at least one processor, an electronic design and analyzing the electronic design. The method may further include automatically generating one or more preconditions representative of metastability effects at the output of at least one synchronizer associated with the electronic design. The method may also include automatically generating, based upon, at least in part, the one or more preconditions, one or more properties configured to analyze a propagation of the metastability effects associated with the at least one synchronizer.

One or more of the following features may be included. In some embodiments, analyzing the propagation of the metastability effects may include analyzing a fan-out cone associated with the at least one synchronizer. The method may include visually displaying at least one of the metastability effects at an annotated graph. In some embodiments, the annotated graph may be configured to display the at least one synchronizer and at least one clock domain. The annotated graph may be configured to display at least one of a safe area, a node reached by metastability effects, and a metastability convergence point. The annotated graph may be configured to display at least one node and wherein the at least one node corresponds to a flip-flop, an input port, or an output port. The electronic design may be a clock-domain crossing design.

In some embodiments, a computer-readable storage medium having stored thereon instructions that when executed by a machine result in one or more operations is provided. Operations may include receiving, using at least one processor, an electronic design and analyzing the electronic design. Operations may further include automatically generating one or more preconditions representative of metastability effects at the output of at least one synchronizer associated with the electronic design. Operations may also include automatically generating, based upon, at least in part, the one or more preconditions, one or more properties configured to analyze a propagation of the metastability effects associated with the at least one synchronizer.

One or more of the following features may be included. In some embodiments, analyzing the propagation of the metastability effects may include analyzing a fan-out cone associated with the at least one synchronizer. Operations may include visually displaying at least one of the metastability effects at an annotated graph. In some embodiments, the annotated graph may be configured to display the at least one synchronizer and at least one clock domain. The annotated graph may be configured to display at least one of a safe area, a node reached by metastability effects, and a metastability convergence point. The annotated graph may be configured to display at least one node and wherein the at least one node corresponds to a flip-flop, an input port, or an output port. The electronic design may be a clock-domain crossing design.

In one or more embodiments of the present disclosure, a system is provided. The system may include a computing device configured to receive, using at least one processor, an electronic design. The at least one processor further configured to analyze the electronic design and automatically generate one or more preconditions representative of metastability effects at the output of at least one synchronizer associated with the electronic design. The at least one processor may be further configured to automatically generate, based upon, at least in part, the one or more preconditions, one or more properties configured to analyze a propagation of the metastability effects associated with the at least one synchronizer.

One or more of the following features may be included. In some embodiments, analyzing the propagation of the metastability effects may include analyzing a fan-out cone associated with the at least one synchronizer. The at least one processor may be further configured to visually display at least one of the metastability effects at an annotated graph. In some embodiments, the annotated graph may be configured to display the at least one synchronizer and at least one clock domain. The annotated graph may be configured to display at least one of a safe area, a node reached by metastability effects, and a metastability convergence point. The annotated graph may be configured to display at least one node and wherein the at least one node corresponds to a flip-flop, an input port, or an output port.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Figure 1:
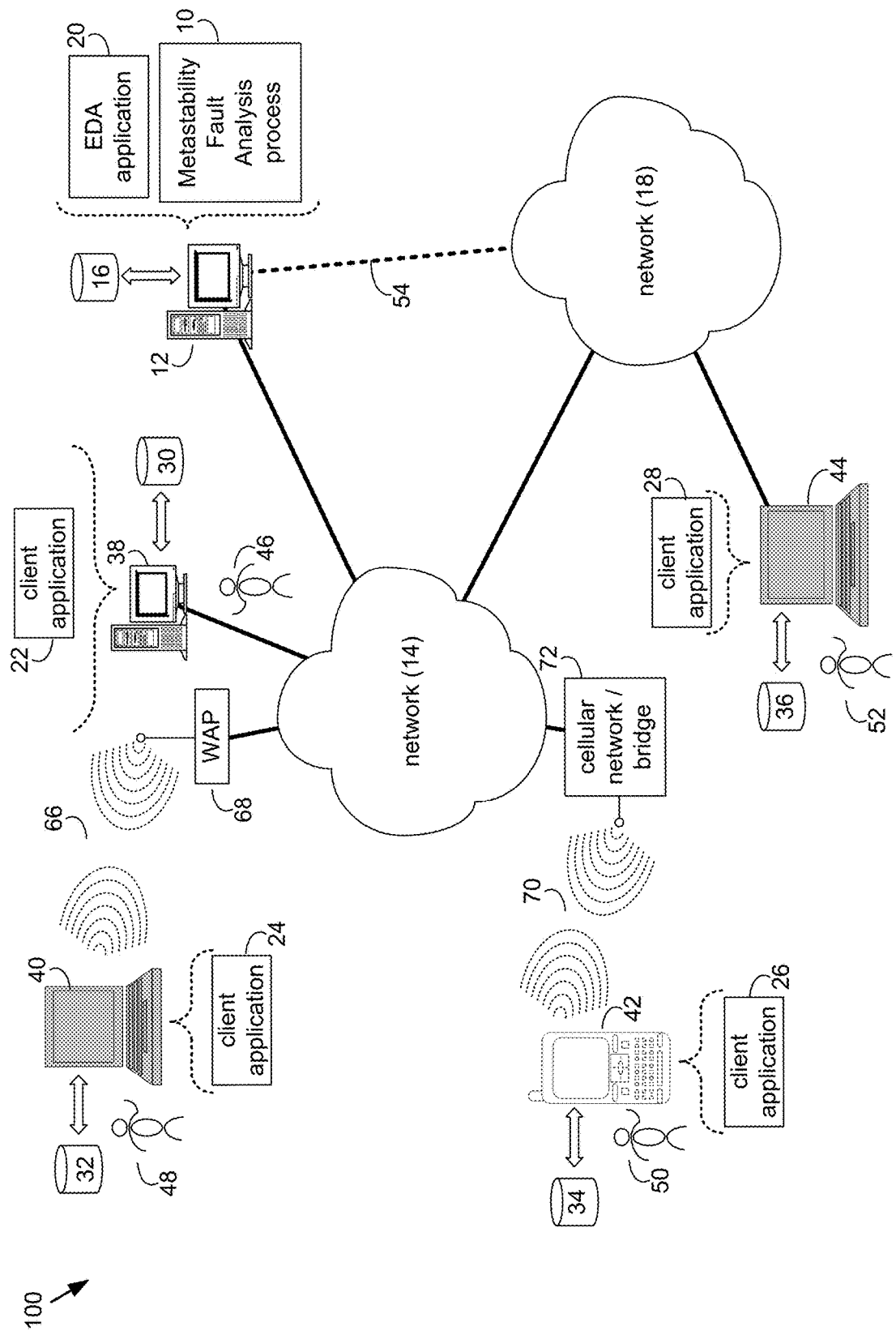
FIG. 1 is a system diagram depicting aspects of the metastability fault analysis process in accordance with an embodiment of the present disclosure.

In Clock-Domain Crossing (CDC) designs, even structurally and functionally correct synchronizers cannot completely mitigate the effects of metastability due to the unpredictability in the exact cycle that they will sample their inputs. The existence of convergence paths in certain topologies can make this uncertainty translate into erroneous behaviors.

Analyzing metastability convergence in formal verification requires the user to write properties to model both the effects of metastability and its propagation through the design. This requires significant knowledge from the user, and usually suffers from the state-explosion problem. In addition, debugging metastability convergence problems requires a considerable effort, due to the difficulty of focusing on relevant information.

Accordingly, embodiments of the present disclosure may be configured to enable formal analysis to automatically identify metastability convergence problems without relying on user properties. Embodiments of the present disclosure may be configured to automatically extract a set of preconditions to represent metastability effects at the output of identifiable synchronizers. These preconditions significantly improve performance and scalability. Based on the preconditions, the metastability fault analysis process described herein may recursively generate properties to analyze the propagation of metastability effects through the synchronizers fan-out cones, again improving performance and scalability. As is discussed in further detail hereinbelow, results may be shown in an annotated graph, where safe areas, nodes which are reached by metastability effects and metastability convergence points are clearly indicated. In this way, automatic metastability formal fault analysis using synchronizer information is a scalable, formal based, fully automated and easy to debug flow to identify where metastability might really be a problem in a CDC design.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown a metastability fault analysis process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) miming a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the metastability fault analysis process may reside on and be executed, in whole or in part, by a client electronic device, such as a personal computer, notebook computer, personal digital assistant, or the like.

The instruction sets and subroutines of metastability fault analysis process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language ("HDL") files and/or any suitable files that may be associated with an electronic design.

Server computer 12 may execute a web server application, examples of which may include but are not limited to: Microsoft IIS, Novell Webserver™, or Apache® Webserver, that allows for HTTP (e.g., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28). EDA application 20 may be referred to herein as a design tool.

Metastability fault analysis process 10 may be a stand alone application, or may be an applet/application/script that may interact with and/or be executed within EDA application 20. In addition/as an alternative to being a server-side process, the metastability fault analysis process may be a client-side process (not shown) that may reside on a client electronic device (described below) and may interact with an EDA client application (e.g., one or more of EDA client applications 22, 24, 26, 28). Further, the metastability fault analysis process may be a hybrid server-side/client-side process that may interact with EDA application 20 and an EDA client application (e.g., one or more of client applications 22, 24, 26, 28). As such, the metastability fault analysis process may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize metastability fault analysis process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (e.g., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (e.g., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (e.g., CSMA/CA) for path sharing. The various 802.11x specifications may use phase-shift keying (e.g., PSK) modulation or complementary code keying (e.g., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both).

Figure 2:
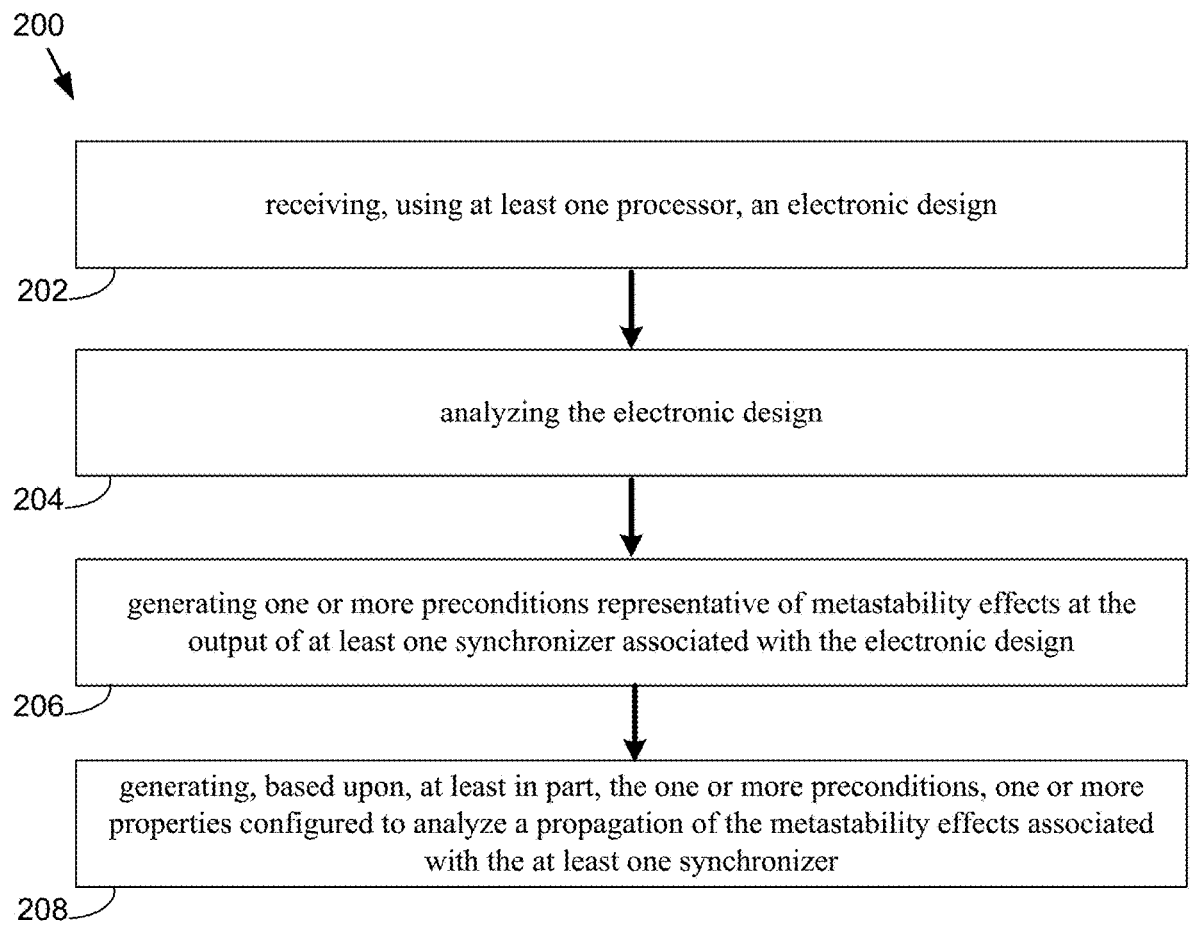
FIG. 2 is a flowchart depicting operations consistent with the metastability fault analysis process of the present disclosure.

Referring now to FIG. 2, a method 200 consistent with an embodiment of metastability fault analysis process 10 is provided. The method may include receiving (202), using at least one processor, an electronic design and analyzing (204) the electronic design. The method may further include automatically generating (206) one or more preconditions representative of metastability effects at the output of at least one synchronizer associated with the electronic design. The method may also include automatically generating (208), based upon, at least in part, the one or more preconditions, one or more properties configured to analyze a propagation of the metastability effects associated with the at least one synchronizer.

As discussed above, embodiments of the present disclosure may be configured to enable formal analysis to automatically identify metastability convergence problems without relying on user properties. Embodiments of the present disclosure may be configured to automatically extract a set of preconditions to represent metastability effects at the output of identifiable synchronizers. These preconditions significantly improve performance and scalability. Based on the preconditions, the metastability fault analysis process described herein may recursively generate properties to analyze the propagation of metastability effects through the synchronizers fan-out cones, again improving performance and scalability. As is discussed in further detail hereinbelow, results may be shown in an annotated graph, where safe areas, nodes which are reached by metastability effects and metastability convergence points are clearly indicated. In this way, automatic metastability formal fault analysis using synchronizer information is a scalable, formal based, fully automated and easy to debug flow to identify where metastability might really be a problem in a CDC design.

In the example pseudocode below the following definitions may apply:

Let D be the design provided by the user.
Let G be a graph representation of D, where the nodes are flops, input and output ports and the edges are combinational logic between flops.
Let S be the set of synchronizers identified in G.
For a given synchronizer s belonging to S, let out(s) be the data output node of the synchronizer, where metastability might appear, and let out(S) be the set of all synchronizers' data output nodes.
Let NC be the set of destination nodes of CDC pairs not covered by any synchronizer.
Let M be the set of metastability injection nodes, defined as the union of sets out(S) and NC.
Let METASTABILITY(s) be a condition which is true whenever out(s) is affected by the uncertainty due to metastability.
Let PROPS be an initially empty set of properties.
Let $p(i \rightarrow j)$ denote a property which is true if there exists a functional path in G from node i to node j, and which is false if such a path does not exist.

One possible example of pseudocode is provided below, however it should be noted that this is provided merely by way of example:

```
// Initialization
build G from D
find CDC pairs in G
find S and NC in G
build M as out(S) U NC
foreach m in M:
    // Create initial property to be proven
    foreach neighbor n of m in G:
        if m E out ( S ) :
            add property p(m->n) with METASTABILITY (s) as the
                precondition to PROPS
        else:
            add property p(m->n) with $changed(input(m)) as the
                precondition to PROPS
    endforeach
    // Prove remaining properties and generate new ones until PROPS
    is empty while PROPS is not empty:
        p(m->j) = next property from PROPS
        prove p(m->j)
        if p(m->j) passes:
            add label of node in to node j
            foreach neighbor n of j in G:
                if m E out ( S ) :
                    add property p(m->n) with METASTABILITY (s)
                        as the precondition to PROPS
                else:
                    add property p(m->n) $changed(input(m)) as the
                        precondition to PROPS
            endforeach
        endif
    endwhile
endforeach
show labeled graph G
```

As shown in the definitions and the pseudocode provided above, given a design including clock-domain crossing pairs and a set S of identifiable synchronizers, embodiments of metastability fault analysis process 10 may be configured to automatically build the set of nodes M where metastability can be originated, by considering both the synchronizers' data output nodes (out (S)) and the destination flops of CDC pairs not covered by a synchronizer (NC).

In addition, for each synchronizer s∈S, embodiments of metastability fault analysis process 10 may automatically set up a condition METASTABILITY (s), which states the conditions under which the uncertainty due to metastability is present at the synchronizer's data output node out(s). In the case of CDC pairs not covered by a synchronizer, a change in the destination flop's input may be used as the condition for metastability.

Embodiments of metastability fault analysis process 10 may then analyze whether the effects of metastability may propagate from M to the design's outputs. This may be accomplished through an incremental process for each node m in M, where the formal engine may be fed with automatically generated properties that check for the existence of functional paths between m and the nodes in its fan-out cone, given the appropriate precondition (METASTABILITY (s) or change in the destination flop's input).

Referring again to FIGS. 3-4, in some embodiments, circles may represent signals (e.g., either outputs of flops, or top-level input or output ports in the design). Pentagons may represent synchronizers. They are a collapsed view of the set of nodes that compose each synchronizer. Squares may represent design instances. They are a collapsed view of the hierarchy of instances and nodes included inside them.

Figure 3:
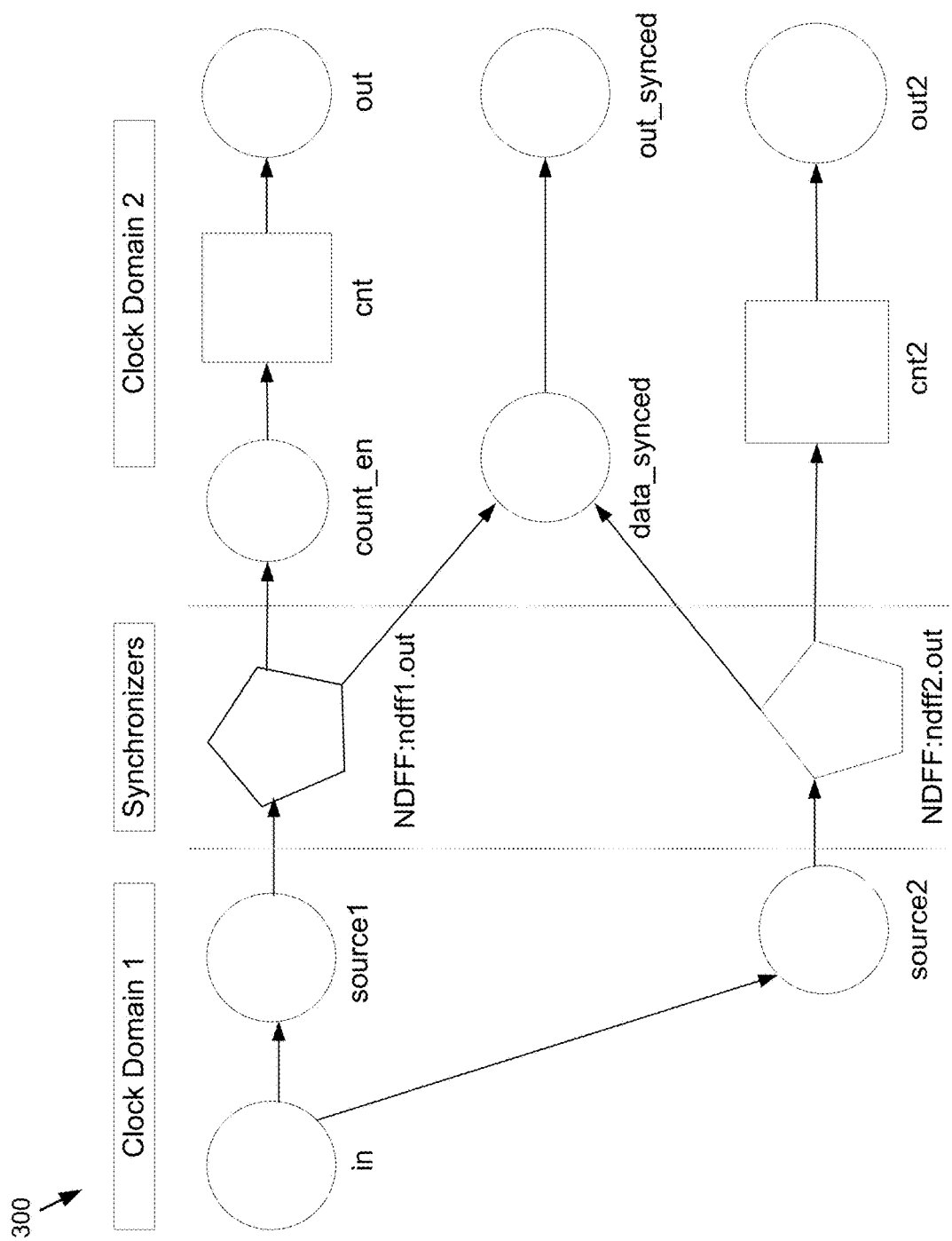
FIG. 3 is a diagram depicting aspects of the metastability fault analysis process in accordance with an embodiment of the present disclosure.

In some embodiments, metastability fault analysis process 10 may begin with an unlabeled graph, as that shown in FIG. 3. In the example, set S is composed of synchronizers ndff1 and ndff2, and set NC is empty. For each synchronizer s in S, the condition METASTABILITY(s) may be automatically generated. In the example, conditions METASTABILITY(ndff1) and METASTABILITY(nddf2) would be generated and available to be used.

In some embodiments, the next step may involve the creation of the following properties, which may use METASTABILITY(s) as a precondition:

p(ndff1.out→count_en): Functional path exists from ndff1.out to count_en, given that METASTABILITY (ndff1)

p(ndff1.out→data_synced): Functional path exists from ndff1.out to data_synced, given that METASTABILITY(ndff1)

p(ndff2.out→cnt2): Functional path exists from ndff2.out to cnt2, given that METASTABILITY(ndff2)

p(ndff2.out→data_synced): Functional path exists from ndff2.out to data_synced, given that METASTABILITY(ndff2)

In some embodiments, those properties may then be fed to the formal engines, which may return the following results in the example:

ndff1.out to count_en: FALSE
ndff1.out to data_synced: TRUE
ndff2.out to cnt2: TRUE
ndff2.out to data_synced: TRUE As a result of the passing (TRUE) ones, the following new properties would be created:

ndff1.out to out_synced: Functional path exists from ndff1.out to out_synced, given that METASTABILITY (ndff1)

ndff2.out to out_synced: Functional path exists from ndff2.out to out_synced, given that METASTABILITY (ndff2)

ndff2.out to out2: Functional path exists from ndff2.out to out2, given that METASTABILITY(ndff2)

Again, those properties would be fed to the formal engines, which may return the following results:

ndff1.out to out_synced: TRUE
ndff2.out to out_synced: TRUE
ndff2.out to out2: TRUE Since all considered paths reached the design outputs, no more properties are generated and the process may end.

Figure 4:
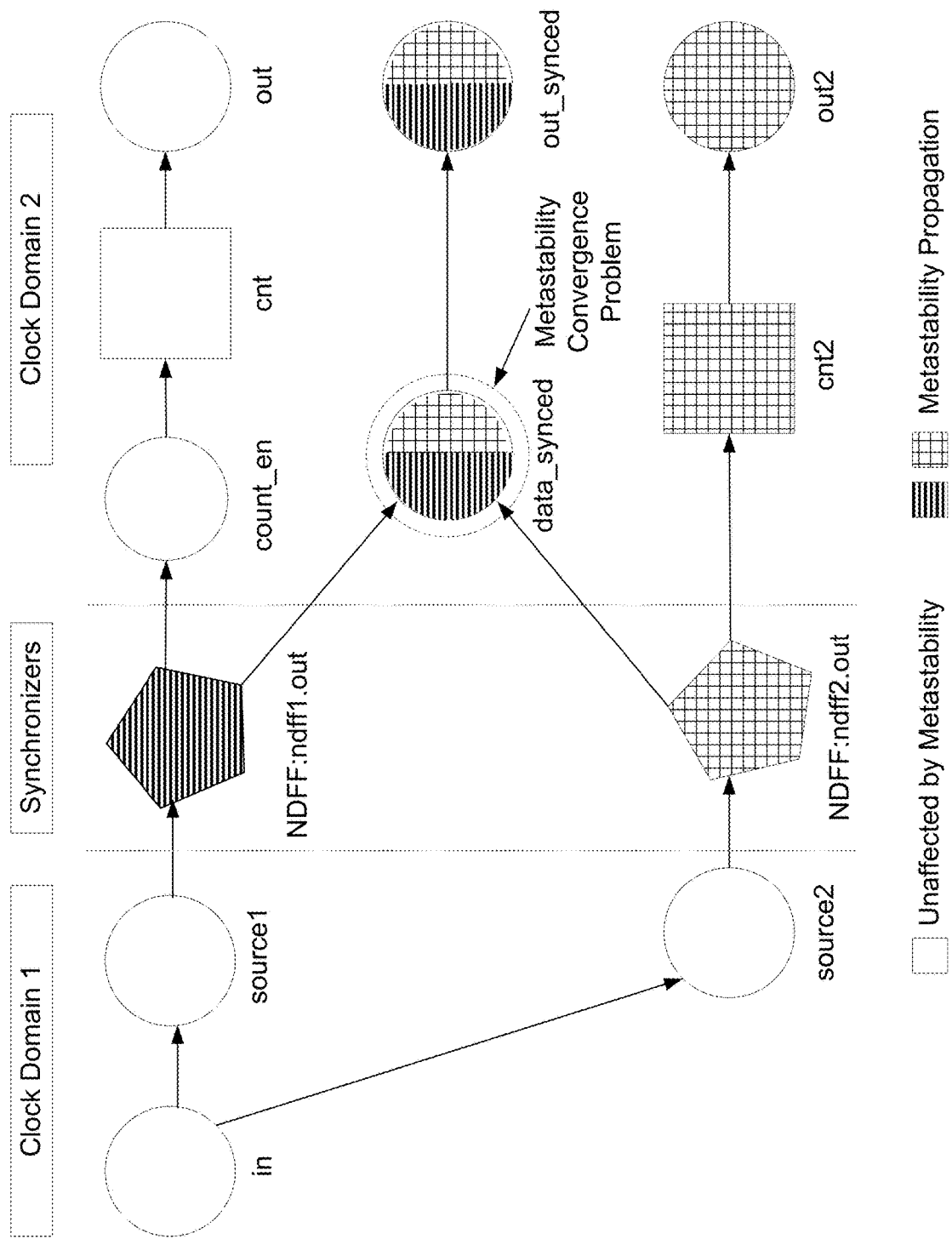
FIG. 4 is a diagram depicting aspects of the metastability fault analysis process in accordance with an embodiment of the present disclosure.

In some embodiments, the result may be the annotated graph shown in FIG. 4. Signals in which the metastability coming from ndff1.out is able to propagate are labeled in a first color (e.g. depicted by the horizontal hatching in FIG. 4), while ones coming from ndff2.out are labeled in a different color (e.g. depicted by the cross-hatching in FIG. 4). Nodes for which no functional path exists, like count_en, are simply kept without a label.

Finally, nodes which are affected by metastability being propagated from more than one source (like data_synced) may be labeled using the colors of the different source synchronizers. These nodes represent metastability convergence problems.

During this process, and referring also to FIG. 4, nodes in M's fan-out cone may be labeled as either unaffected by metastability effects (shown in white in FIG. 4), or subject to the effects of metastability originated in some node m E M (shown in cross or horizontal hatching in FIG. 4). Metastability convergence points are therefore indicated as nodes suffering the effects of metastability from more than one source (shown as mixed cross/horizontal hatching nodes in FIG. 4).

This automated process may end when the effects of metastability are propagated from every m∈M to either the design's outputs or some frontier that prevents further propagation of metastability effects.

Embodiments of metastability fault analysis process 10 may be configured to utilize formal technology to provide the level of metastability coverage demanded by users. In addition, by automating a series of tasks in an innovative way, embodiments of metastability fault analysis process 10 may leverage formal analysis to identify metastability convergence problems without relying on user properties, thus removing this burden from the user.

Embodiments of metastability fault analysis process 10 may provide numerous advantages over existing technologies. In contrast to the simple structural checks for the detection of convergence problems, embodiments disclosed herein are based on functional checks, therefore reducing the number of false violations reported. Additionally and/or alternatively, the teachings of the present disclosure are formal based, in opposition to the simulation based approaches, so any safe node is guaranteed not to suffer from the modeled metastability effect. Unlike other formal based solutions, embodiments of metastability fault analysis process 10 do not rely on user properties, so it can be easily configurable and fully automated. In addition to not requiring user properties, the use of the annotated graph as a visualization tool, thus providing better usability.

Embodiments of metastability fault analysis process 10 may reduce the number of false violations reported, since it is based on functional checks. Some embodiments may be configured to identify situations where a synchronizer is generating metastability but its effects may not propagate beyond a certain frontier. Embodiments of metastability fault analysis process 10 may be efficient and scalable, thanks to the automatic definition of METASTABILITY (s) preconditions for every supported synchronizer, which diminish the state-explosion problem. Embodiments included herein may be easily configurable and fully automated, since it does not rely on user properties. Every property required to model metastability effects and their propagation are recursively and automatically generated. The use of a labeled graph as a visualization tool significantly helps the user to identify and debug metastability convergence problems.

In some embodiments, EDA application 20 and/or metastability fault analysis process 10 may support a variety of languages and/or standards. EDA application 20 may support one or more software extensions and may be used in conjunction with one or more EDA tools such as those available from the Assignee of the subject application.

As used in any embodiment described herein, the terms "circuit" and "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof. Embodiments of the present disclosure may be incorporated in whole or in part into any design tools.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for use in a formal verification of an electronic design comprising:
receiving, using at least one processor, a clock-domain crossing electronic design;
analyzing the electronic design;
automatically generating a set of nodes where metastability can be originated;
automatically generating one or more preconditions representative of metastability effects at the output of at least one synchronizer associated with the electronic design;
automatically generating, based upon, at least in part, the one or more preconditions, one or more properties configured to analyze a propagation of the metastability effects associated with the at least one synchronizer; and
visually displaying at least one of the metastability effects and one or more unaffected areas at an annotated graph configured to display the at least one synchronizer and at least one clock domain.

2. The computer-implemented method of claim 1, wherein analyzing the propagation of the metastability effects includes analyzing a fan-out cone associated with the at least one synchronizer.

3. The computer-implemented method of claim 1, wherein the annotated graph is configured to display at least one of an area unaffected by a metastability issue, a node reached by metastability effects, and a metastability convergence point.

4. The computer-implemented method of claim 1, wherein the annotated graph is configured to display at least one node and wherein the at least one node corresponds to a flip-flop, an input port, or an output port.

5. A non-transitory computer-readable storage medium having stored thereon instructions that when executed by a machine result in the following operations for use in a formal verification of an electronic design:
receiving, using at least one processor, a clock-domain crossing electronic design;
analyzing the electronic design;
automatically generating a set of nodes where metastability can be originated;
automatically generating one or more preconditions representative of metastability effects at the output of at least one synchronizer associated with the electronic design;
automatically generating, based upon, at least in part, the one or more preconditions, one or more properties configured to analyze a propagation of the metastability effects associated with the at least one synchronizer; and
visually displaying at least one of the metastability effects and one or more unaffected areas at an annotated graph configured to display the at least one synchronizer and at least one clock domain, wherein the annotated graph displays a node unaffected by metastability in a first manner and a node affected by metastability in a second manner distinct from the first manner.

6. The computer-readable storage medium of claim 5, wherein analyzing the propagation of the metastability effects includes analyzing a fan-out cone associated with the at least one synchronizer.

7. The computer-readable storage medium of claim 5, wherein the annotated graph is configured to display at least one of an area unaffected by a metastability issue, a node reached by metastability effects, and a metastability convergence point.

8. The computer-readable storage medium of claim 5, wherein the annotated graph is configured to display at least one node and wherein the at least one node corresponds to a flip-flop, an input port, or an output port.

9. A system for a formal verification of an electronic design comprising:
a computing device configured to receive, using at least one processor, a clock-domain crossing electronic design, the at least one processor further configured to analyze the electronic design and automatically generate a set of nodes where metastability can be originated, the at least one processor further configured to automatically generate one or more preconditions representative of metastability effects at the output of at least one synchronizer associated with the electronic design, the at least one processor further configured to automatically generate, based upon, at least in part, the one or more preconditions, one or more properties configured to analyze a propagation of the metastability effects associated with the at least one synchronizer, wherein analyzing the propagation of the metastability effects includes analyzing a fan-out cone associated with the at least one synchronizer, the at least one processor further configured to visually display the metastability effects and one or more unaffected areas at an annotated graph configured to display the at least one synchronizer and at least one clock domain.

10. The system of claim 9, wherein analyzing the propagation of the metastability effects includes analyzing a fan-out cone associated with the at least one synchronizer.

11. The system of claim 9, wherein the annotated graph is configured to display at least one of an area unaffected by a metastability issue, a node reached by metastability effects, and a metastability convergence point.

12. The system of claim 9, wherein the annotated graph is configured to display at least one node and wherein the at least one node corresponds to a flip-flop, an input port, or an output port.

\* \* \* \* \*